3,295,612
CONTROL LINKAGE FOR EARTH-WORKING TOOLS
Roy E. Mayo, Walnut Creek, Calif., and Wayne E. Roberts, East Peoria, Ill., assignors to Caterpillar Tractor Co., Peoria, Ill., a corporation of Illinois
Filed Nov. 12, 1964, Ser. No. 410,518
3 Claims. (Cl. 172—464)

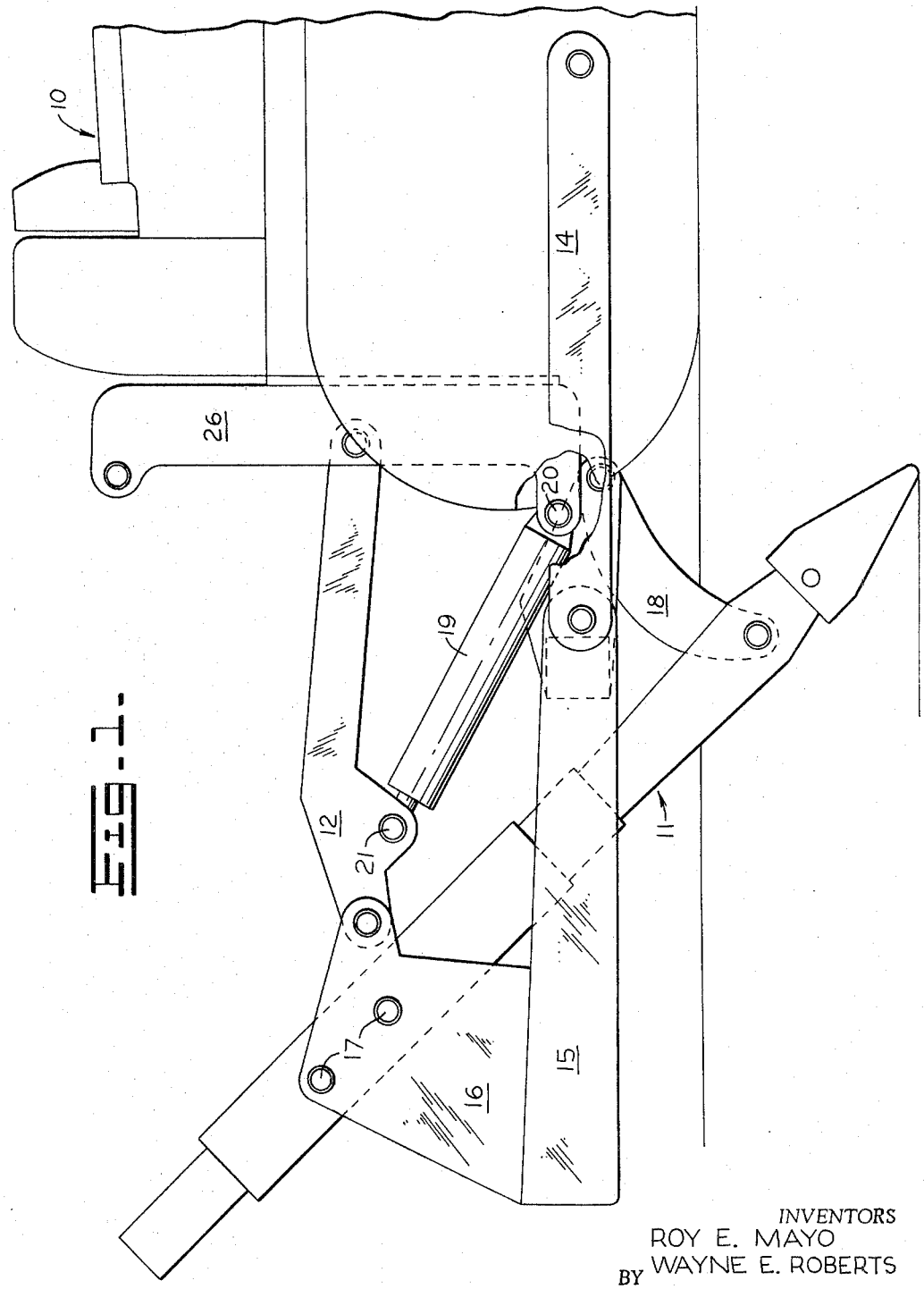

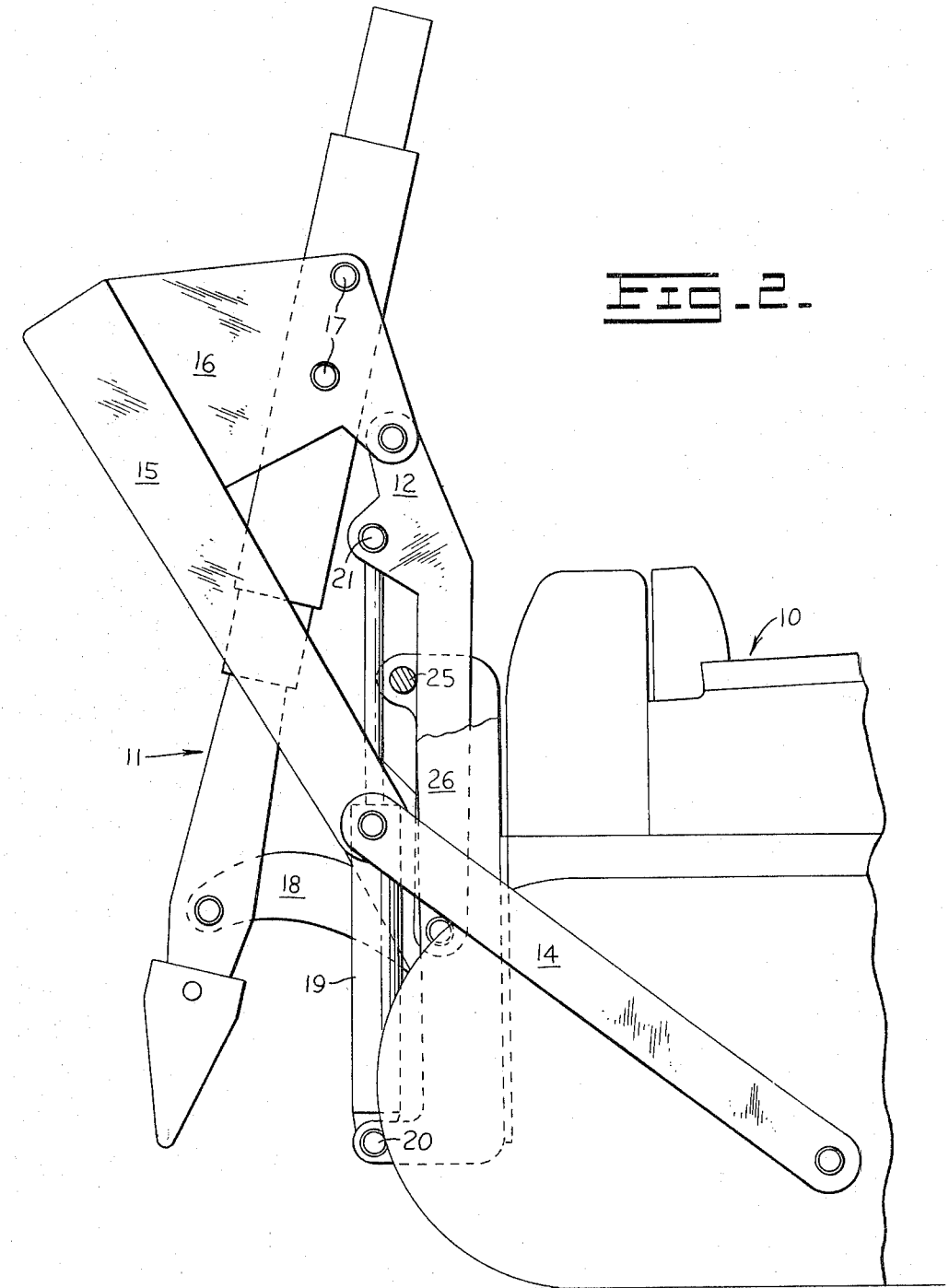

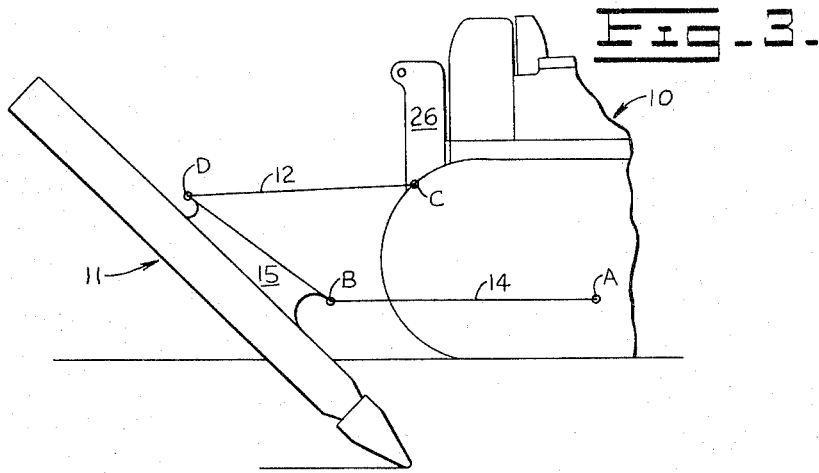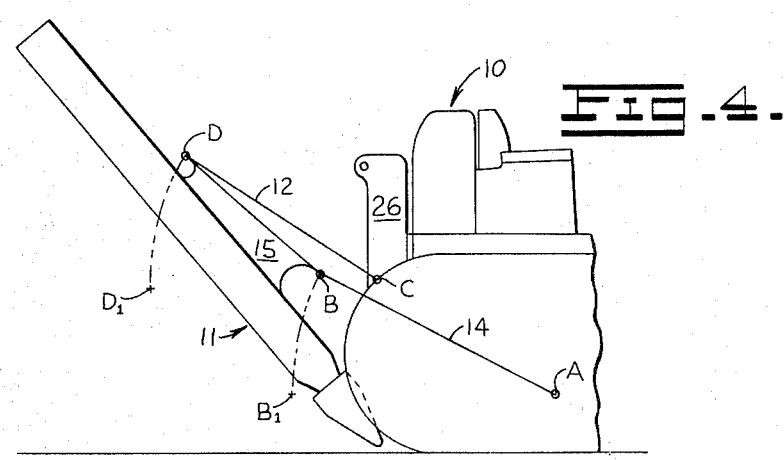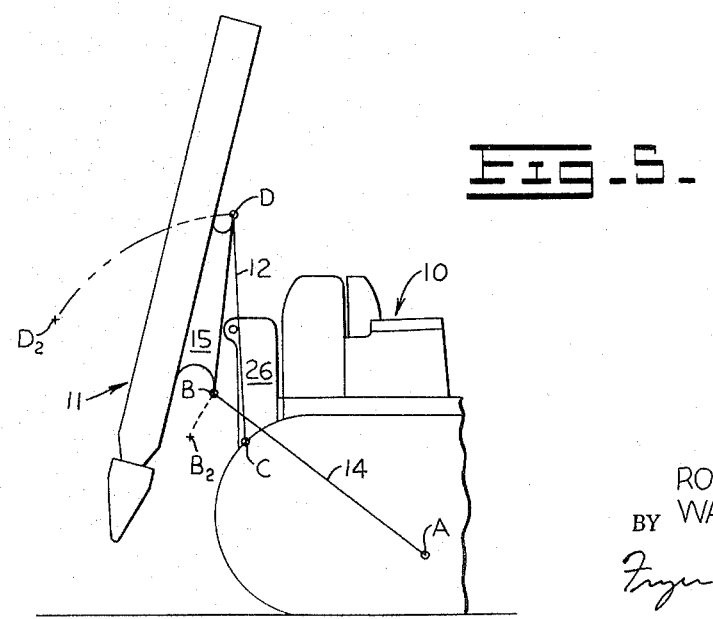

This invention relates to linkage for drawing a tool behind a tractor and for raising and lowering the tool with respect to the ground.

The invention is designed for use with a large tractor mounted earthmoving ripper and may find other desirable applications.

It is common practice to mount a ripper shank tooth on parallel or substantially parallel linkage so that upon pivoting said linkage to control movement of the shank into and out of the soil its attitude or angle with respect to the soil does not change and an optimum working angle is maintained throughout a wide range of operating depths. As the ripper moves more or less vertically on a slight arc, its upper or transport position is well to the rear of the tractor. Since the current trend is toward larger rippers and fluid actuated impact rippers involving great weight, this rearward transport position is undesirable as it tends to overbalance the tractor giving rise to various difficulties in steering and traction.

It is the object of the present invention to overcome the above mentioned difficulties and to provide draft and control linkage for a tractor drawn ripper or similar implement capable of maintaining a substantially constant implement angle while the ripper is in the ground and operable to swing the implement toward the rear of the tractor as it is withdrawn from the ground and moves toward its transport position. Further objects and advantages of the invention and the manner in which it is carried into practice are made apparent in the following specification wherein reference is made to the accompanying drawings.

In the drawings:

FIG. 1 is a view in side elevation of the rear end of a tractor and a ripper connected therewith by linkage embodying the present invention with the ripper disposed beneath the surface of the earth;

FIG. 2 is a view similar to FIG. 1 with the ripper in its raised or transport position;

FIG. 3 is a schematic view illustrating in simple form the linkage which supports the ripper and showing it in its lowermost position;

FIG. 4 is a view like FIG. 3 showing the ripper raised just clear of the surface of the ground, and;

FIG. 5 is a similar view showing the ripper in its uppermost or transport position.

In FIG. 1 a tractor generally indicated at 10 is shown as drawing a ripper tool generally indicated at 11. Spaced pairs of links 12 and 14 (one of each pair shown) form a connection between the tractor and a frame 15 which carries the ripper. In the particular ripper construction illustrated, the frame has an upstanding bracket 16 supporting the upper end of the ripper assembly as by pins 17. Its lower end is supported by a pivoted link 18 which allows some oscillatory movement of the forward end of the ripper imparted to it by pneumatic impact mechanism of well known type, not shown, actuated by a source of air under pressure on the tractor.

Hydraulic jack 19 is pivoted at one end with respect to the tractor as at 20 and at the other end with respect to the link 12 as at 21. Extension and contraction of the jack 19 which may be two jacks, one for each link 12, will affect raising and lowering of the entire ripper assembly between the positions illustrated in FIG. 1 and FIG. 2. A simplified disclosure of the linkage is shown in schematic views 3 to 5 wherein link 14 is shown as pivoted between points A and B on the tractor and ripper frame respectively and link 12 is shown as pivoted between points C and D on the tractor and ripper frame. Links 12 and 14 are so nearly the same length and the distances A-C and B-D are so nearly the same that a linkage which is essentially parallel in its operation is provided throughout a limited range of movement. Consequently, as the ripper assembly 11 is raised from its lower operating position in FIG. 3 to the position just clear of the ground shown in FIG. 4, the distance traveled by pivot B from B', which is the position of FIG. 3, is substantially the same as the distance D–D' and the angle of approach of the ripper has been substantially identical throughout all of the positions in which it could operate.

However, since the linkage is not a parallelogram but in fact a trapezoid in which the link 14 is greater in length than the link 12, and in which the distance A–B–D is greater than the distance A–C–D, a condition is approached in FIG. 4 where the link 14 begins to cross the pivot point C, whereas further upward movement of link 12 under the influence of the jack occurs more rapidly about pivot point C, whereas upward movement of link 14 is limited by the rigid connection between the points B and D. Consequently, as shown in FIG. 5, pivot point B has moved a short distance from point B2 whereas D has traversed a much greater distance from point D2. As is apparent from the schematic views the transition from the parallelogram type movement between FIGS. 3 and 4 and the abrupt upward swinging movement between FIGS. 4 and 5, which brings the center of gravity of the ripper assembly and supporting linkage close to the tractor, occurs abruptly as the pivot points A–C and D approach a straight line. Furthermore, this abrupt change in type of movement has been designed to occur immediately upon removal of the ripper tip from the earth so that while the ripper angle is substantially constant in the earth it is swung to a close-in transport position as quickly as possible.

The ripper assembly may be locked in its transport position by a pin 25, see FIG. 2, which is inserted through suitable apertures in bracket 26 to retain link 12 against downward swinging movement.

We claim:

1. Draft and control linkage between a tractor and a frame supporting a ripper shank comprising upper and lower pairs of links pivotally connected between the tractor and the frame for swinging movement in a vertical plane, said ripper shank having a normal earth engaging angular position and said links being normally substantially parallel and horizontal, with said frame pivotal connections being normally in a diagonal plane, said pivot points of said links approaching a parallelogram sufficiently close to hold the ripper shank at substantially the same angle as it is swung upwardly through the ground from said normal position, but said lower links being longer than the upper links and arranged to cause faster swinging of the upper links when the ripper shank has cleared the ground, and means for swinging the shank clear of the ground and inwardly toward the tractor at its upper end wherein said upper links are swung to a substantially vertical position while said lower links are swung to a substantially diagonal position and wherein said frame pivotal connections are in a substantially vertical plane.

2. The combination of claim 1, wherein said means comprises hydraulic jacks pivoted at one end to the tractor and at the other end to the upper links.

3. The combination of claim 2, wherein the means mounting said jacks permit said jacks to swing to a substantially vertical position when said shank is swung to said upper position.

References Cited by the Examiner

UNITED STATES PATENTS

| 2,169,917 | 8/1939 | Keeler | 172—464 |
| 2,674,279 | 4/1954 | Wilson | 172—444 |
| 2,712,358 | 7/1955 | Kuhary et al. | 172—444 |
| 2,787,202 | 4/1957 | Gladis | 172—699 |
| 3,191,324 | 6/1965 | Beyers et al. | 172—277 |

FOREIGN PATENTS

| 234,013 | 6/1961 | Australia. |

ANTONIO F. GUIDA, *Acting Primary Examiner.*

J. R. OAKS, *Assistant Examiner.*